United States Patent [19]
Park

[11] Patent Number: 6,052,378
[45] Date of Patent: Apr. 18, 2000

[54] BASE BAND SIGNAL TRANSMITTING DEVICE IN BASE STATION OF MOBILE COMMUNICATION SYSTEM USING CDMA

[75] Inventor: Weun-Hyung Park, Kyungki-do, Rep. of Korea

[73] Assignee: LG Information & Communication, Ltd., Seoul, Rep. of Korea

[21] Appl. No.: 08/975,493

[22] Filed: Nov. 21, 1997

[30] Foreign Application Priority Data

Nov. 27, 1996 [KR] Rep. of Korea ..................... 96-58204

[51] Int. Cl.$^7$ ........................... C01B 31/32; H04B 15/00
[52] U.S. Cl. ........................................ 370/441; 375/206
[58] Field of Search ................................. 370/335, 342, 370/200, 206, 222, 441; 375/206

[56] References Cited

U.S. PATENT DOCUMENTS 5,748,623  5/1998  Sawahashi et al. .................... 370/342

*Primary Examiner*—Chi H. Pham
*Assistant Examiner*—Brenda H. Pham
*Attorney, Agent, or Firm*—Fleshner & Kim

[57] ABSTRACT

A base band signal transmitting device in a base station of a mobile communications system is disclosed including a CDMA modem unit constructed in a manner that a plurality of CDMA modems are detachably mounted on one board, each of the CDMA modems converting a digital voice signal into direct band spread signal by sectors, to generate a digital base band signal; a digital signal summing unit constructed in a manner that a digital summing device is mounted on another board, the digital summing device for digital-summing the direct band spread digital signals received from the CDMA modem unit by sectors and transmitting them in parallel; and a signal processing unit including a FIR low pass filter for converting the digital signals received from the digital signal summing unit into parallel signals and removing high frequency component from them, a digital/analog converter for converting the output signals of the FIR low pass filter into analog signals, and a base/intermediate frequency band upward conversion circuit for upward-converting the base band analog signals converted by the converter into analog signals of intermediate frequency band and high frequency band, the FIR low pass filter, digital/analog converter and base/intermediate frequency band upward conversion circuit being mounted on another separate board.

1 Claim, 3 Drawing Sheets

BASE BAND SIGNAL TRANSMITTING DEVICE IN BASE STATION OF MOBILE COMMUNICATION SYSTEM USING CDMA

BACKGROUND OF THE INVENTION

1. Field of the Invention

The present invention relates to a code division multiple access (CDMA) mobile communications system, specifically, to a base band signal transmitting device in the base station of a mobile communications system.

2. Description of the Prior Art

FIG. 1 is a block diagram of a transmitting device in the base station of a conventional mobile communications system. Referring to FIG. 1, the transmitting device includes: a base band signal transmitting circuit 1 for summing digital signals received from a plurality of voice channels and converting the summed digital signal into an analog signal; a base/intermediate frequency band upward conversion circuit 21, connected to base band signal transmitting circuit 1, for converting the base band analog signal into a signal of intermediate frequency band of 4.95 MHz; a cellular/PCS band upward conversion circuit 31, connected to base/intermediate frequency band upward conversion circuit 21, for converting the intermediate-frequency analog signal received from base/intermediate frequency band upward conversion circuit 21 into a signal of high-frequency band of 800 MHz or 1.8 GHz; a power amplifier 41, connected to cellular/PCS band upward conversion circuit 31, for amplifying the power of the high-frequency signal; and a transmission antenna 42, connected to power amplifier 41, for radiating the high-frequency signal.

FIG. 2 is a block diagram of a base band signal transmitting device in the base station of the conventional mobile communications system. Referring to FIG. 2, the base band signal transmitting device includes: four CDMA modems 52 for modulating digital voice signals received from a vocoder into direct band spread signals by sectors, to be suitable for CDMA standard, IS-95, to generate digital base band signals, and transmitting them in parallel; a digital summing device 53, commonly connected to CDMA modems 52, for summing the direct band spread digital signals from CDMA modems 52 by sectors to generate I-signal in in-phase and Q-signal in quadrature-phase, and transmitting them in parallel; a digital/analog converter (DAC) 54, connected to digital summing device 53, for converting the I- and Q-digital signals into analog signals; a base band low pass filter 55, connected to DAC 54, for filtering the high-frequency component from the analog signals from DAC 54, to be suitable for CDMA signal standard; an amplifier 56, connected to base band low pass filter 55, for amplifying the low-pass filtered CDMA analog signals; and a buffer amplifier 57, connected to amplifier 56, for adjusting the amplified CDMA analog signals, and performing the impedance matching between summing amplifiers of the base/intermediate band upward conversion circuit.

CDMA modems 52, digital summing device 53, DAC 54, base band low pass filter 55 and amplifier 56 are mounted on one board, buffer amplifier 57 is mounted on another board, and the base/intermediate frequency band upward conversion circuit including the summing amplifiers is mounted on another separate board. Buffer amplifier 57 is connected to the summing amplifier of the base/intermediate frequency band upward conversion circuit by sectors using a separate cable, and base band low pass filter 55 is composed of an inductor and capacitor.

The signal transmission procedure in the base band signal transmitting device in the base station of the above-described conventional mobile communications system is explained below. First, the voice digital signals generated by the vocoder are converted into direct band spread signals by sectors to become digital base band signals according to CDMA modems 52, and transmitted in parallel to digital summing device 53 which sums the digital base band signals by sectors. The digital base band signal summed by digital summing device 53 passes through digital/analog conversion step, unnecessary frequency component removing step and amplification step, and reaches the base/intermediate frequency band upward conversion circuit.

In the base band signal transmitting device of the base station of the aforementioned conventional mobile communications system, the signal transmission between the amplifier and buffer amplifier is performed via a bus, and signal transmission between the buffer amplifier and base/intermediate frequency band upward conversion circuit is carried out by sectors in analog mode using the separate cable. Accordingly, noise component is introduced during the transmission, resulting in deterioration of calling quality. Furthermore, it is impossible to obtain cutoff characteristic and linear phase characteristic which are required for the mobile communications system because the base band low pass filter is configured of passive elements. Also, the conventional base band signal transmitting device needs large area. Moreover, the CDMA modems are mounted on the same board together with the digital summing device, DAC, amplifier and low pass filter so that the number of CDMA modems which can be mounted on one board is limited.

SUMMARY OF THE INVENTION

Therefore, the present invention has been made in view of the above problems, and it is an object of the present invention to provide a base band signal transmitting device in the base station of a mobile communications system, which is not affected by noise so as to gain satisfactory filtering characteristic, and is possible to adjust the number of CDMA modem.

To accomplish the object of the present invention, there is provided a base band signal transmitting device in a base station of a mobile communications system, including a CDMA modem unit constructed in a manner that a plurality of CDMA modems are detachably mounted on one board, each of the CDMA modems converting a digital voice signal into direct band spread signal by sectors, to generate a digital base band signal; a digital signal summing unit constructed in a manner that a digital summing device is mounted on another board, the digital summing device for digital-summing the direct band spread digital signals from the CDMA modem unit by sectors and transmitting them in parallel; and a signal processing unit including a finite impulse response(FIR) low pass filter for converting the digital signals received from the digital signal summing unit into parallel signals and removing high frequency component from them, a digital/analog converter for converting the output signals of the FIR low pass filter into analog signals, and a base/intermediate frequency band upward conversion circuit for upward-converting the base band analog signals converted by the converter into analog signals of intermediate frequency band and high frequency band, the FIR low pass filter, digital/analog converter and base/intermediate frequency band upward conversion circuit being mounted on another separate board.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENT

Figure 1:
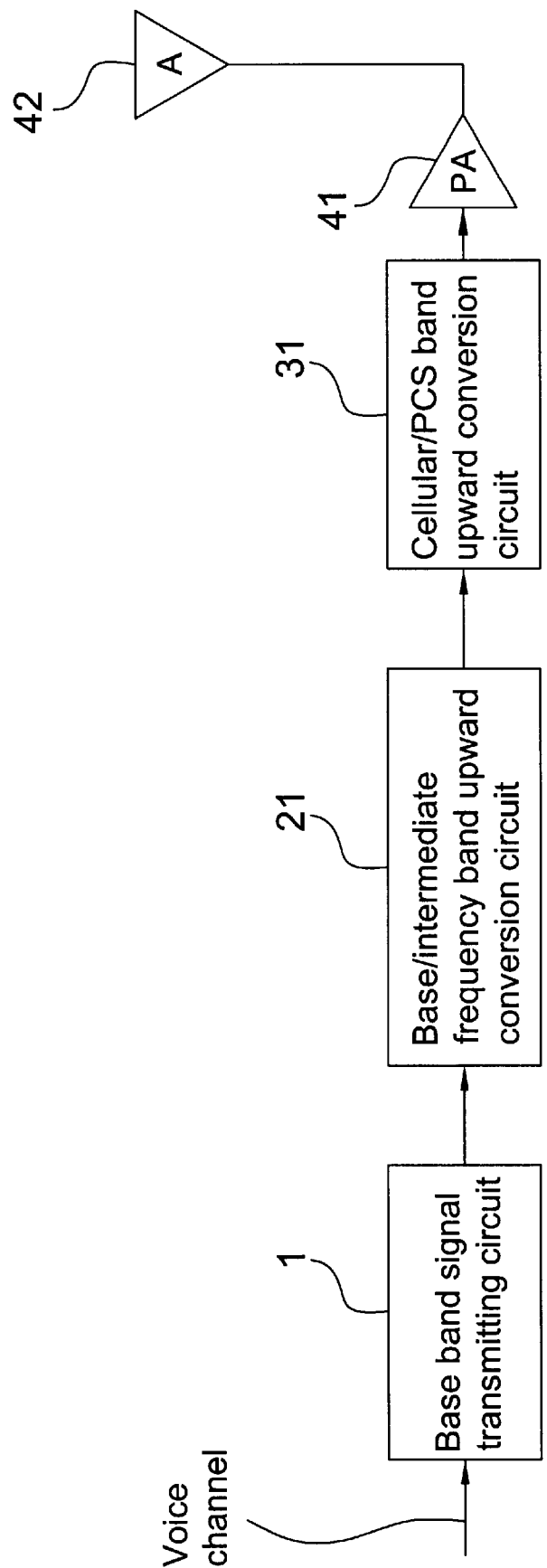
FIG. 1 is a block diagram of a transmitting device in the base station of a conventional mobile communications system.
Figure 2:
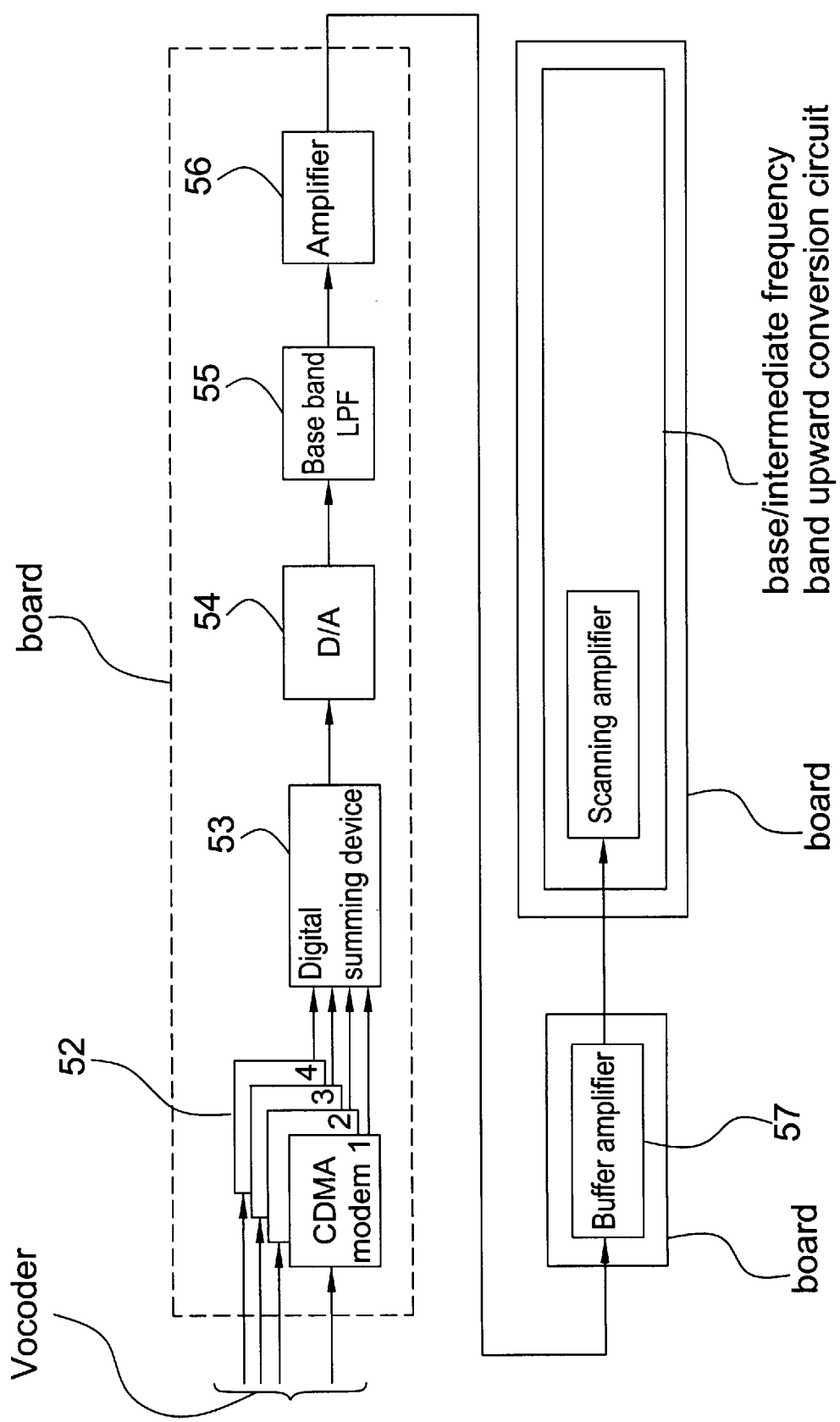
FIG. 2 is a block diagram of a base band signal transmitting device in the base station of the conventional mobile communications system.
Figure 3:
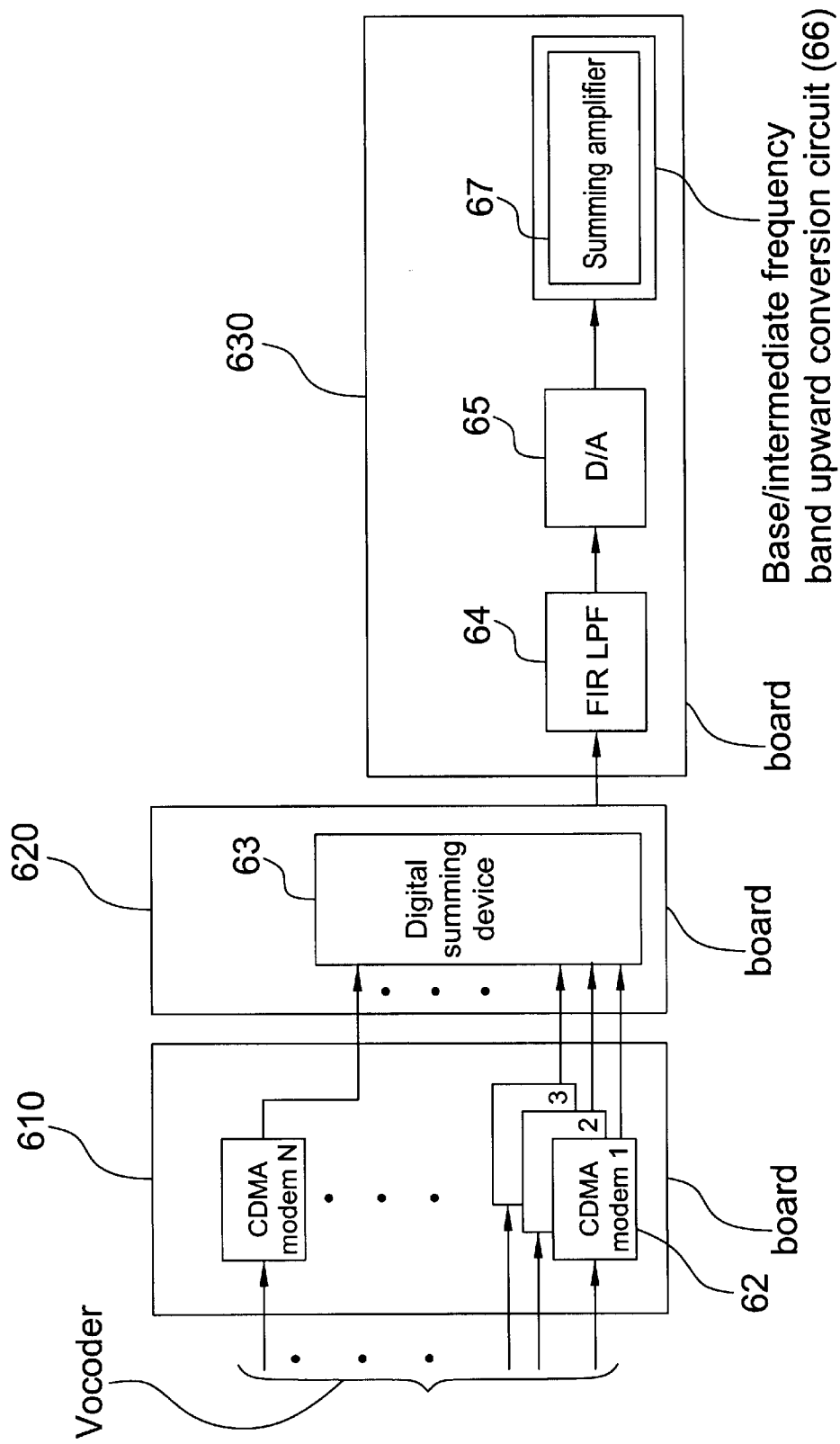
FIG. 3 is a block diagram of a base band signal transmitting device in the base station of a mobile communications system according to the present invention.

FIG. 3 is a block diagram of a base band signal transmitting device in the base station of a mobile communications system according to the present invention. Referring to FIG. 3, the base band signal transmitting device includes: a CDMA modem unit 62 constructed in a manner that a plurality of CDMA modems, which convert digital voice signals received from a vocoder into direct band spread signals by sector to generate digital base band signals, are mounted on a separate board; a digital signal summing unit 620 constructed in a manner that a digital summing device 63, which digitally sums the direct band spread digital signals by sectors and serially transmits the signals through I+, I− channels and Q+, Q− channels, is mounted on another board; and a signal processing unit 630 having a FIR low pass filter 64 for converting the digital signals from digital summing device 63 into parallel signals and removing high-frequency component from them, a DAC 65 for converting the output signals of FIR low pass filter 64 into analog signals, and a base/intermediate frequency band upward conversion circuit 66, FIR low pass filter 64, DAC 65 and base/intermediate band upward conversion circuit 66 being mounted on another separate board.

A plurality of CDMA modems 62 mounted on one separate board converts the digital voice signals received from the vocoder into the direct band spread signals by sectors, to be suitable for CDMA standard, IS-95, to generate the digital base band signals, and serially transmits them. Digital summing device 63, mounted on another board and commonly connected to CDMA modems 62, sums the direct band spreaded digital signals by sectors and serially transmits the summed digital signals through I+ I− channels and Q+, Q− channels. FIR low pass filter 64 converts the digital signals serially received through I+, I− channels and Q+, Q− channels into parallel signals, and removes high-frequency component from them, to be suitable for CDMA signal standard. DAC 65, connected to FIR low pass filter 64, converts the output signals of FIR low pass filter 64 into analog signals, and transmit them to the summing amplifier of base/intermediate frequency band upward conversion circuit 66.

The signal transmission in the base band signal transmitting device of the present invention will be described below. The voice digital signals generated by the vocoder are direct-band-spreaded by CDMA modem unit 610 by sectors, to become the digital base band signals, and serially transmitted to digital signal summing unit 620. The serial transmission of the signals is for the purpose of preventing transmission error due to internal and external noises resulted from that CDMA modem unit 610 and digital signal summing unit 620 are mounted on different boards from each other.

In digital signal summing unit 620, digital summing device 63 sums the direct band spreaded digital base band signals by sectors, and serially transmits them to FIR low pass filter 64 of signal processing unit 630. The reason that the signals are serially transmitted is for preventing transmission error due to internal and external noises resulted from that digital signal summing unit 620 and signal processing unit 630 are mounted on two separate boards.

The digital base band signals transmitted to FIR low pass filter 64 pass through unnecessary frequency removing step and digital/analog converting step, and reach the base/intermediate frequency band upward conversion circuit. FIR low pass filter 64 can be designed by letting n=28, and data bit number=14 in Blackman window function for FIR filter $h(n)=0.42-0.5 \cos(2\pi n/M-1)+0.08 \cos(4\pi n/M-1)$ which is described in "Introduction to Digital Signal Processing", written by John G. Proakis, published by Maxwell Macmillan, pp. 549, table 8–1.

As described above, according to the present invention, CDMA modem unit is mounted on a separate board so that the extension of CDMA modem is facilitated, and the DAC and base/intermediate frequency band upward conversion circuit are mounted on another separate board to allow analog signals to be transmitted on the same board. Furthermore, since FIR low pass filter is used for correct control of filtering characteristic, it is possible to remove noise component which is internally or externally introduced during the signal transmission. Accordingly, cutoff characteristic of filter and linear phase characteristic required for the mobile communications system can be obtained, and signal error generated during analog signal processing can be reduced.

While certain embodiments and details have been shown for the purpose of illustrating the present invention, it will be apparent to those skilled in the art that various changes and modifications may be made herein without departing from the spirit or scope of the invention.

What is claimed is:

1. A base band signal transmitting device in a base station of a mobile communications system, comprising:

a CDMA modem unit constructed in a manner that a plurality of CDMA modems are detachably mounted on one board, each of the CDMA modems converting a digital voice signal into a direct band spread signal by sectors, to generate a digital base band signal;

a digital signal summing unit constructed in a manner that a digital summing device is mounted on another board, the digital summing device for digital-summing the direct band spread digital signals received from the CDMA modem unit by sectors and transmitting them in parallel; and a signal processing unit including a FIR low pass filter for converting the digital signals received from the digital signal summing unit into parallel signals and removing high frequency component from them, a digital/analog converter for converting the output signals of the FIR low pass filter into analog signals, and a base/intermediate frequency band upward conversion circuit for upward-converting the base band analog signals converted by the converter into analog signals of intermediate frequency band and high frequency band, the FIR low pass filter, digital/analog converter and base/intermediate frequency band upward conversion circuit being mounted on another separate board.

* * * * *